(No Model.)
M. E. RICE.
SAD IRON ATTACHMENT FOR PRESSING SEAMS.
No. 592,918. Patented Nov. 2, 1897.
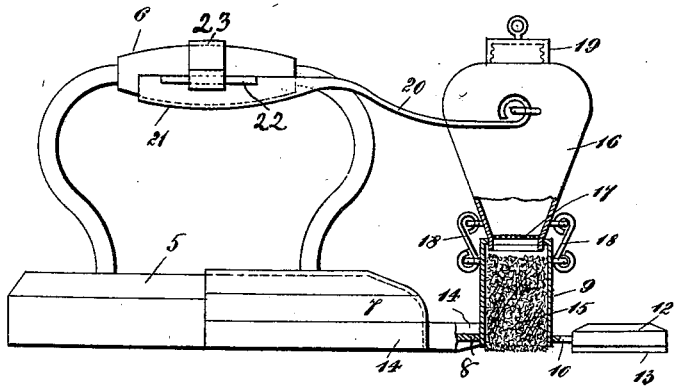
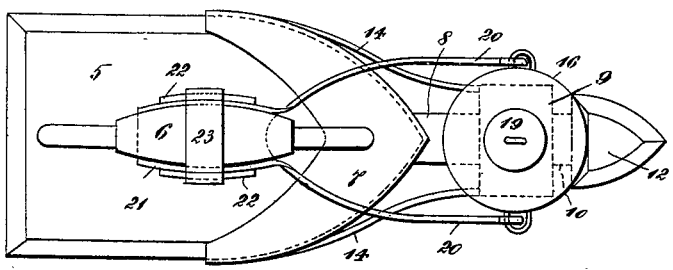
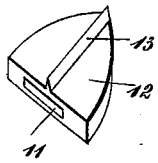
WITNESSES
INVENTOR
Margaret E. Rice,
BY Edgar Tate & Co
ATTORNEYS.

United States Patent Office.

MARGARET ELIZABETH RICE, OF HILLSBOROUGH, TEXAS.

SAD-IRON ATTACHMENT FOR PRESSING SEAMS.

SPECIFICATION forming part of Letters Patent No. 592,918, dated November 2, 1897.

Application filed December 16, 1896. Serial No. 615,866. (No model.)

*To all whom it may concern:*

Be it known that I, MARGARET ELIZABETH RICE, a citizen of the United States, residing at Hillsborough, in the county of Hill and State of Texas, have invented certain new and useful Improvements in Sad-Iron Attachments for Pressing Seams, of which the following is a full and complete specification, such as will enable those skilled in the art to which it appertains to make and use the same.

This invention relates to sad-iron attachments; and the object thereof is to provide a device of this class which is adapted to be connected with an ordinary sad-iron, and which is designed for use in opening or spreading and for dampening seams preparatory to ironing or pressing the same, the opening or spreading of the seams and the dampening and ironing or pressing thereof being all performed at a single operation.

The invention is fully disclosed in the following specification, of which the accompanying drawings form a part, in which—

Figure 1 is a side view of a sad-iron provided with my improved attachment, the attachment being partly shown in section; Fig. 2, a plan view of the device as shown in Fig. 1, and Fig. 3 a bottom perspective view of a part of the attachment.

In the drawings forming part of this specification, the same parts of my improvement are designated by the same numerals of reference throughout the several views, and in said drawings I have shown at 5 an ordinary sad-iron, which is provided with the usual handle 6, and in the practice of my invention I provide an attachment which comprises a yoke-shaped cap or cover 7, which is adapted to inclose or to be mounted on the forward end of the sad-iron 5, as clearly shown in Figs. 1 and 2, and said yoke-shaped attachment 7 is pointed at its forward end and provided with a projecting plate or arm 8, which supports and is rigidly secured to a suitable receptacle 9, which is shown in vertical section in Fig. 1 and in dotted lines in Fig. 2, and projecting forwardly of the base of the receptacle 9 is a plate or arm 10, which is shown in full lines in Fig. 1 and in dotted lines in Fig. 2, and said plate or arm 10 is adapted to enter a corresponding hole or opening 11 formed in a triangular block or head 12.

The block or head 12 is similar in form to a sad-iron and is provided on its under side with a longitudinal rib 13, which is triangular in form in cross-section and which is adapted to enter the seam, the lower edge of the rib being in line with the bottom of the iron 5, and secured to the sides of the yoke-shaped attachment 7 are arms 14, which project forward and are connected with and rigidly secured to the sides of the receptacle 9, at the bottom thereof, and which serve to form additional supports for said receptacle.

The receptacle 9 is open at the bottom and top and is filled with sponge or other absorbing material, as shown at 15, and mounted thereon is a vessel 16, which is preferably conical in form and the apex of which is directed downwardly and is adapted to enter the top of the receptacle 9, and said vessel 16 is provided with a perforated bottom 17 and is connected with the receptacle 9 by side loops 18.

The vessel 16 is provided at its top with a neck, which is closed by a removable cap or cover 19 in the usual manner, and said vessel is adapted to be filled or partially filled with water, and the perforations in the bottom 17 thereof are very small and designed to allow of the slow but gradual flow of the water therethrough into the sponge or other absorbing material 15. The vessel 16 is also provided with curved side arms 20, which are connected therewith in the manner of an ordinary bail, and said side arms are in practice carried backwardly in the direction of the handle 6 of the sad-iron and are connected by a cross-head 21, which is oblong in form and semicircular in cross-section and adapted to fit the under side of the handle 6 of the sad-iron, and the cross-head 21 is provided at its opposite sides with outwardly-directed flanges 22, and I also provide a spring-clamp 23, which is adapted to be placed over and crosswise of the handle 6 of the sad-iron and to engage with the flanges 22 of the cross-head 21 of the arms 20, and thus secure said cross-head to the handle 6 of the sad-iron, and in practice one of the said arms 20 is passed through the said handle, and the ends of both arms 20 are then attached to the vessel 16, as will be readily understood.

The operation of the device will be readily understood from the foregoing description when taken in connection with the accompanying drawings and the following statement thereof. The attachment is connected with the sad-iron as described, and as shown in Figs. 1 and 2, and the said sad-iron is employed in the usual manner, and in the operation thereof the water in the vessel 16 is gradually fed through the perforated bottom of said vessel into the sponge or other absorbing material in the receptacle 9, and the head or block 12, when connected with the arm or plate 10, as shown in the drawings and as herein described, serves in the operation of the device to separate the parts of the seam, as will be readily understood, and said separate parts or sides of the seam are moistened by the sponge or other absorbing material in the receptacle 9, which presses thereon, and the seam is ironed or pressed in the usual manner by the sad-iron.

My invention is not limited to the means herein described for connecting the vessel 16 with the receptacle 9, and any desired means may be employed for securing the attachment to the sad-iron, and it will therefore be apparent that various changes in and modifications of the construction herein described may be made without departing from the spirit of my invention or sacrificing its advantages.

Having fully described my invention, I claim as new and desire to secure by Letters Patent—

1. An attachment for sad-irons comprising a yoke-shaped device which is adapted to be connected with the iron, said yoke-shaped device being pointed at its forward end and provided with a forwardly-directed support, a receptacle connected with said support and open at its lower end, and a triangular block or head connected with said receptacle, in front thereof, and in line with the bottom of the iron, said receptacle being provided with a sponge, and with means for feeding water thereinto, substantially as shown and described.

2. An attachment for sad-irons comprising a yoke-shaped device which is adapted to be connected with the iron, said yoke-shaped device being pointed at its forward end and provided with a forwardly-directed support, a receptacle connected with said support, and open at its lower end, and a triangular block or head connected with said receptacle, in front thereof, and in line with the bottom of the iron, said receptacle being provided with a sponge, and with means for feeding water thereinto, consisting of a vessel connected with the top thereof, and provided with a perforated bottom, substantially as shown and described.

3. An attachment for sad-irons comprising a yoke-shaped device which is adapted to be connected with the iron, said yoke-shaped device being pointed at its forward end and provided with a forwardly-directed support, a receptacle connected with said support and open at its lower end, and a triangular block or head connected with said receptacle, in front thereof, and in line with the bottom of the iron, said receptacle being provided with a sponge, and with means for feeding water thereinto, consisting of a vessel connected with the top thereof, and provided with a perforated bottom, said vessel being also provided with a bail which is adapted to be secured to the handle of the sad-iron, substantially as shown and described.

In testimony that I claim the foregoing as my invention I have signed my name, in presence of the subscribing witnesses, this 7th day of December, 1896.

MARGARET ELIZABETH RICE.

Witnesses:
 ALINE EVANS RICE,
 R. M. VAUGHAN.